Figure 1:
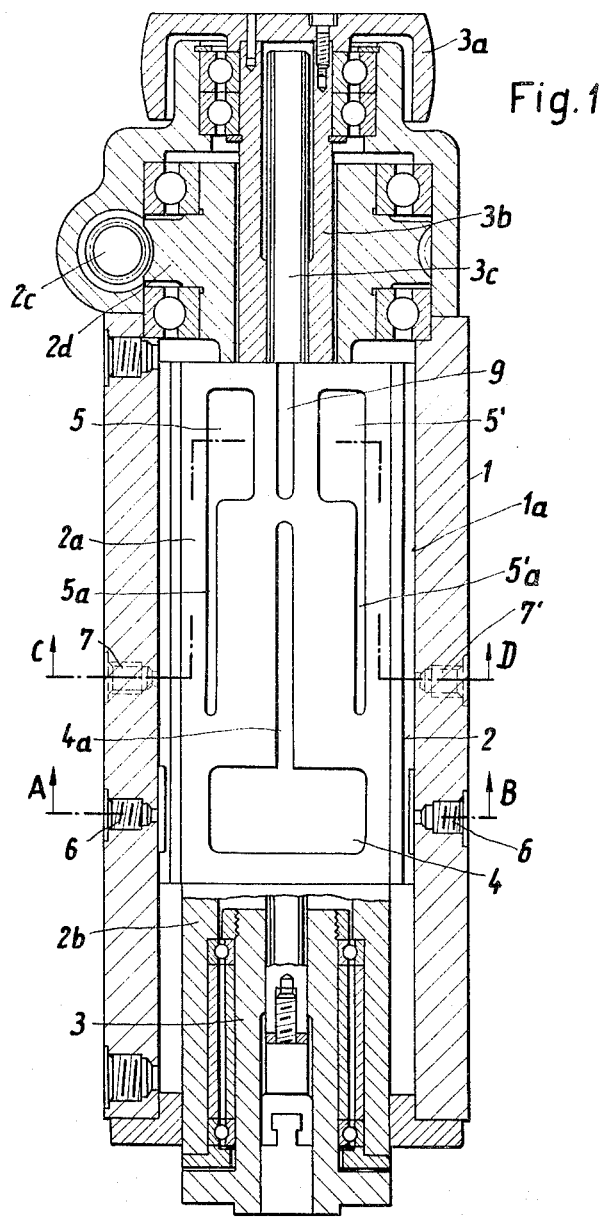

Aug. 2, 1966

C. PLEGER ETAL 3,263,530

PRECISION BORING HEADS

Filed Jan. 18, 1965

2 Sheets-Sheet 1

United States Patent Office 3,263,530
Patented August 2, 1966

3,263,530
PRECISION BORING HEADS
Curt Pleger, Oberrieden-Zurich, Switzerland, and Walter Clashausen, Remscheid, Germany, assignors to Gebruder Honsberg, Remscheid-Hasten, Germany, a company of Germany
Filed Jan. 18, 1965, Ser. No. 426,094
Claims priority, application Germany, Jan. 18, 1964,
H 51,429
3 Claims. (Cl. 77—1)

This invention relates to a precision boring head containing a spindle sleeve axially movably mounted in a spindle head casing and comprising a polygonal prismatic guiding portion which is substantially non-inertially maintained in centralised position by the pressure of a flowing pressurised medium, the end of the spindle sleeve nearest the tool having a smaller diameter than said guiding portion and holding the driven spindle in bearings providing no lateral play and preventing axial movement of the spindle relative to the sleeve. There has already been described a precision boring head of such a kind in earlier application No. 371,957/64.

In the precision boring head according to this earlier application the guiding portion of the spindle sleeve is of polygonal prismatic shape and axially movably guided in a cylindrical bore of the casing in such manner that the edges between adjacent polygon faces bear against the internal peripheral surface of the cylindrical bore, whereas the polygon faces extending between said edges in conjunction with the surrounding cylindrical surface of the bore form narrow longitudinal chambers in which a liquid lubricant can reach the centre of the guiding portion of the sleeve. In order to permit the lubricant in these chambers to centralise the spindle sleeve in the bore with substantially no lateral play, the spindle sleeve is axially rotated inside the bore. The lubricant is thereby forced into the wedge-shaped angles at the edges of the polygon faces, where it forms a thin high pressure lubricant film between said edges and the containing cylindrical wall of the bore.

It has been found that the pressure of this thin wedge-shaped film at the edges of the polygon faces has a "dynamic" centering effect on the sleeve. This centering effect is due to the fact that even slight eccentricities of the guiding portion of the spindle sleeve in relation to the axis of the containing cylindrical bore generate lubricant pressures which provide a powerful restoring thrust tending to return the sleeve into central position, because the resistance to flow experienced by the lubricant at those edges where the clearance from the cylindrical bore is increased is at the same time substantially reduced, whereas the resistance to flow and hence the hydraulic pressure at the diametrically opposite edges substantially rise.

The above described centring effect on the spindle sleeve in its containing bore keeps the sleeve in centralised position in a manner which is not in practice affected by the magnitude of the cutting thrusts or of other transverse forces and which therefore prevents chatter which often occurs in precise small clearance bearings because the lubricant film is squeezed out and permits metal to metal contact between the cooperating surfaces. Consequently the boring tool runs perfectly smoothly, the resultant machined surfaces are of excellent quality and the life of the tool is greatly prolonged. Details of this precision boring head can be obtained by referring to my earlier specification.

The object of the present invention is to simplify the construction of the precision boring head described in the earlier patent, though in the same way taking advantage of the self-centring effect on the spindle sleeve of oil pressure generated in the region of a polygonal prismatic guiding portion and of the pressure variations that arise in a flowing film of oil which forces its way through the clearance gaps between the peripheral faces of the guiding portion and the containing internal surface of a spindle head casing.

The precision boring head according to the present invention, containing a spindle sleeve axially movable in a spindle head casing and comprising a polygonal prismatic guiding portion which is substantially non-inertially maintained in centralised position by the pressure of a flowing medium, the end of the spindle sleeve nearest the tool having a smaller diameter than said guiding portion and holding the driven spindle in bearings providing no lateral play and preventing axial displacement of the spindle relative to the sleeve, is characterized in that the spindle sleeve is slidably held with lateral play inside the spindle casing in a bore of polygonal cross section corresponding to the polygonal cross section of the guiding portion of the sleeve, and that the peripheral polygon faces of the guiding portion of the sleeve are provided with pressure chambers or pockets into which the flowing pressurised medium is introduced for maintaining the sleeve in centralised position inside its casing.

At variance with the precision boring head described in the earlier patent the containing bore in the casing is not therefore cylindrical, but has a polygonal section which corresponds to the polygonal section of the guiding portion of the sleeve. The centralising pressure of the medium flowing through the clearance gaps between the peripheral faces of the guiding portion of the sleeve and the containing bore is provided by an external pressure generating source instead of by a supplementary drive means for rotating the sleeve.

The clearance gap or play between the inside surface of the bore and the external polygon faces of the guiding portion of the sleeve as well as the rate of flow of the medium or lubricant through the gaps and its pressure can therefore be arbitrarily chosen and adapted to the required rigidity of axial alignment of the sleeve with due regard to the functional relationships existing between these factors.

Moreover, the torques generated by the cutting thrust can be compensated by pressure differentials of the flowing oil in the clearance gaps between the guiding portion of the sleeve and the internal polygon faces of the containing bore without metal to metal contact occurring.

It is advantageous to provide, on the peripheral faces of the guiding portion of the spindle sleeve, a plurality of recessed pockets located axially away from the centre toward the ends of each face, and to align the pockets nearest the toolholder end of the spindle with the longitudinal centre line of each face, whereas the pockets nearest the rear end of the guiding portion of the sleeve are in pairs symmetrically disposed on either side of the longitudinal centre line of each peripheral polygon face. In order to provide passages through which the pressurised medium can escape from the clearance gaps, the edges between adjacent peripheral polygon faces may be provided with a small radius or chamfered to form longitudinal channels discharging into the remaining free space inside the guiding bore of the casing.

If the pressure pockets are thus arranged, the pockets at the forward end of the guiding portion of the sleeve from which the pressurised medium centrally enters the clearance gaps between these pockets and the outlet channels operate to provide a rigid self-centring effect on the sleeve, whereas the paired disposition of the pressure pockets at the rear end of the guiding portion of the spindle sleeve serve the purpose of distributing the pressure medium in a manner specially adapted to generate a restoring torque when lateral thrusts tend to rotate the spindle sleeve about its axis.

Preferably the pressure medium is admitted through channels containing throttling sections, through openings in the walls of the spindle head casing and through grooves machined into the faces of the guiding portion of the spindle sleeve and providing communication between the openings and the pressure pockets when the spindle sleeve is axially advanced or retracted.

Figure 2:
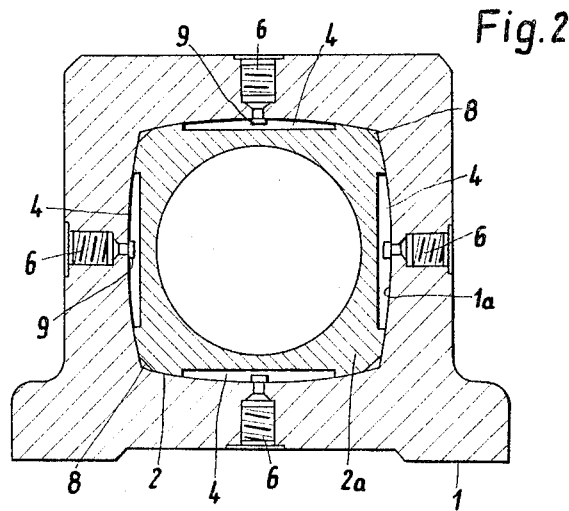
Figure 3:
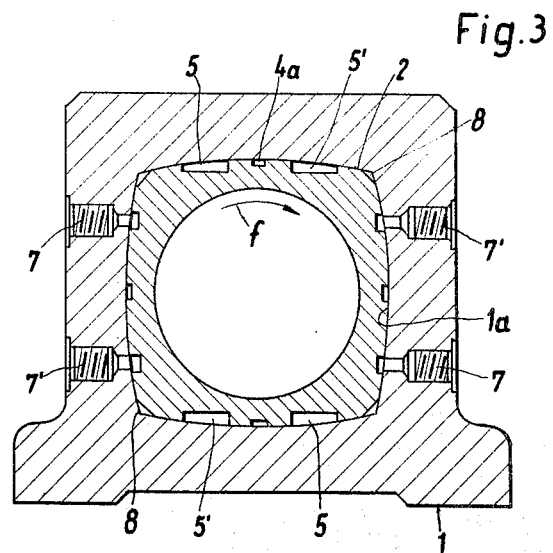

Other features and advantages of the invention will be understood as the following particular description of an illustrative embodiment shown in the accompanying drawings proceeds. In the drawings:

FIG. 1 is a part axial section of the spindle head casing of the proposed precision boring machine, with an elevational view of the guiding portion of the spindle sleeve, FIG. 2 is a cross section taken on the line A–B in FIG. 1, and FIG. 3 is a different cross section taken on the line C–D in FIG. 1.

A casing 1 with an internal square section axial bore 1a with "rounded" sides contains a spindle sleeve 2 which is axially slidably displaceable therein. The spindle sleeve 2 has a central guiding portion 2a and a cylindrical lower end 2b of reduced diameter in which the tool spindle 3 is mounted in bearings with substantially no radial play and in a manner permitting no relative axial movement between spindle and sleeve. The spindle 3 is driven at the head by a pulley 3a affixed to a grooved sleeve 3b in which the splined spindle shaft 3b is slidably movable. The sleeve 2 can be advanced and retracted by a worm 2c meshing with a worm wheel 2d.

According to the invention the guiding portion 2a of the spindle sleeve 2 is of prismatic polygonal shape, which in the illustrated embodiment has the form of a square section prism with "rounded" sides, slidably contained with little radial play in the corresponding square section bore 1a. The peripheral faces of the prismatic polygonal guiding portion of the spindle sleeve are provided with several pressure pockets 4, 5 and 5', formed by shallow recesses machined into the polygon faces of the guiding portion 2a.

The pressure chambers 4 nearest the tool or bottom end of the guiding portion 2a are located in the centre line of the peripheral faces of the polygon, whereas the pressure pockets 5, 5' at the rearward end are located in pairs symmetrically with respect to the longitudinal centre line of each peripheral face of the polygon.

The circulated pressure medium or lubricating oil reaches the pressure pockets 4, 5 and 5' through oil admission openings 6 and 7, 7' in the casing wall. These openings are connectible to pressure pipes fed by an oil pressure pump. In order to maintain communication between the oil admission openings and the associated pockets when the spindle sleeve is axially advanced or retracted, the peripheral faces of the guiding portion 2a of the spindle sleeve contain slot-like communicating channels 4a and 5a, 5'a which extend axially from each of the several pockets 4 and 5, 5' in such a way that the oil admission openings remain in communication either with the associated pockets themselves or with the respective communication channels.

The pressurised oil forced through the oil admission openings into the pockets either directly or through the communication channels, penetrates from these pockets and from the channels into the small clearance gaps between the polygon faces of the guiding portion 2a of the spindle sleeve and the cooperating faces of the internal bore 1a in the spindle head casing. The oil leaves the clearance gaps through longitudinal channels 8 formed by chamferings at the corners of the polygonal cross section of the guiding portion 2a or through a draining slot 9 located midway between the pair of pockets 5 and 5', whence it can escape into the free space remaining in casing 1.

For the supply of the pressurised oil which is intended by its presence in the clearance gaps to centralise the spindle sleeve inside its casing, an oil pump of conventional construction and therefore not specially shown in the drawings delivers oil, drawn from an oil reservoir, at a gauge pressure of say 60 atm. This pressure is maintained at constant level by an overpressure relief valve. Preferably the high pressure oil is taken to each of the oil admission openings 6 and 7, 7' through an oil throttling section. These oil throttling sections may be constricting insertions, built into the oil admission openings themselves.

In the cross section A–B in FIG. 2 it will be seen that four oil admission openings are provided (openings 6), each in direct communication with one of the pressure pockets 4 which are thus filled with the high pressure oil. From these pockets the high pressure oil flows into the narrow clearance gaps between the guiding portion 2a of the spindle sleeve and the spindle casing 1 and it leaves the clearance gaps by escaping into the unpressurised space inside casing 1. Since the geometric dimensions of the four high pressure oil pockets or chambers 4 and their location on the side faces of the polygon section are alike, the volumes of oil which flow into each of the clearance gaps from the several pockets will be the same when the spindle sleeve is in centralised position.

If external forces push the spindle sleeve out of its centralised position the width of the clearance gaps will change, the clearance on one side of the sleeve becoming wider and that on the opposite side correspondingly narrower. A larger volume of oil will therefore enter the wider gap per unit of time and the effect of the throttle in the admission pipe or admission opening is then the creation of a pressure drop in the associated pocket, whereas on the opposite side the restricted rate of oil flow into the reduced clearance gap produces a pressure rise. This pressure differential leads to a substantially non-inertial restoration of the spindle sleeve into its former centralised position.

The pressure pockets 5 and 5' at the rear end of the guiding portion 2a of the sleeve operate in an analogous manner. However, since these pockets are arranged in pairs symmetrically disposed on either side of the longitudinal centre line of each polygon face, differential changes of the oil pressures in the paired pockets are at the same time capable of taking up and compensating pure torques.

If a torque causes the guiding portion 2a of the spindle sleeve to turn about the sleeve axis in relation to the polygon faces of the bore in the casing, say in the direction of the arrow f in FIG. 3, then the clearance gap widths in the region of pockets 5' will be slightly enlarged and those in the region of pockets 5 will be correspondingly reduced. This similarly leads to a pressure drop in pockets 5' and to a pressure rise in pockets 5 with a consequent restoring torque about the spindle sleeve axis which compensates the displacing torque.

We claim:
1. A precision boring head containing a spindle sleeve axially movably mounted in a spindle head casing and comprising a polygonal prismatic guiding portion which is substantially non-inertially maintained in centralised position by the pressure of a flowing pressurised medium, the end of the spindle sleeve nearest the tool having a smaller diameter than said guiding portion and holding the driven spindle in bearings providing no lateral play and preventing axial movement of the spindle relative to the sleeve, characterised in that the spindle sleeve is slideably held with lateral play inside the spindle casing in a bore of polygonal cross section corresponding to the polygonal cross section of the guiding portion of the sleeve and that the peripheral polygon faces of the guiding portion of the sleeve are provided with pressure chambers or pockets into which the flowing pressurised medium is introduced for maintaining the sleeve in centralised position inside its casing.

2. A precision boring head according to claim 1, characterised in that the peripheral faces of the guiding portion of the spindle sleeve are provided with a plurality of recessed pockets located away from the centre, axially towards the ends of each face, the pockets nearest the toolholder end of the spindle being aligned in the longitudinal centre line of each face, whereas the pockets nearest the rear end of the guiding portion of the spindle sleeve are in pairs symmetrically disposed on either side of the longitudinal centre line of each peripheral polygon face.

3. A precision boring head according to claim 1, characterised in that the admission channels of the pressurised medium into the several chambers or pockets incorporate flow throttling means.

No references cited.

WILLIAM W. DYER, JR., *Primary Examiner.*

G. A. DOST, *Assistant Examiner.*